United States Patent [19]

Kosugi et al.

[11] Patent Number: 4,887,083
[45] Date of Patent: Dec. 12, 1989

[54] BIPOLAR WITH EIGHT-ZEROS SUBSTITUTION AND BIPOLAR WITH SIX-ZEROS SUBSTITUTION CODING CIRCUIT

[75] Inventors: Toru Kosugi, Ohmiya; Takahiro Furukawa, Oyama; Hirohisa Miyaou, Yokohama, all of Japan

[73] Assignee: Fujitsu Limited, Kawasaki, Japan

[21] Appl. No.: 167,235

[22] Filed: Mar. 11, 1988

[30] Foreign Application Priority Data

Mar. 12, 1987 [JP] Japan .................. 62-057226

[51] Int. Cl.$^4$ ............................................. H03M 5/18
[52] U.S. Cl. ........................................ 341/56; 371/56; 375/17
[58] Field of Search ............... 341/50, 53, 56, 57, 341/68, 69, 87; 375/17, 20, 25; 370/99, 100; 371/56, 57

[56] References Cited

U.S. PATENT DOCUMENTS

| | | | |
|---|---|---|---|
| 4,747,112 | 5/1988 | Blondeau et al. | 375/20 |
| 4,757,501 | 7/1988 | Gorshe | 370/99 |
| 4,785,466 | 11/1988 | Lee et al. | 375/17 |

Primary Examiner—William M. Shoop, Jr.
Assistant Examiner—Brian Young
Attorney, Agent, or Firm—Staas & Halsey

[57] ABSTRACT

A B8ZS.B6ZS coding circuit commonly used for a B8ZS coding or a B6ZS coding, generating a B8ZS violation signal or a B6ZS violation signal at a same start timing, and formed by a smaller circuit. The B8ZS.B6ZS coding circuit includes a first eight-bit shift register, receiving the input unipolar signal and shifting the same in response to a clock signal, the last two flip-flops in the shift register being reset under the B6ZS mode, a first gate outputting a first consecutive zero detection signal when all flip-flops in the first shift register are reset, a second seven-bit shift register, the last two flip-flops in the shift register being reset under the B6ZS mode, a second gate outputting a second consecutive zero detection signal when all flip-flops in the second shift register are reset, a third gate outputting an exclusive OR signal of the first and the second consecutive zeros detection signals, an inverter and outputting an inverted signal of the output from the third gate, a fourth gate receiving outputs from a sixth flip-flop in the first shift register, first, second, fourth and fifth flip-flops in the second shift register, and outputting a first original coded signal, and a fifth gate receiving outputs from the sixth flip-flop in the first shift register, the inverter, and the first, fourth and fifth flip-flops in the second shift register, and outputting a second original coded signal.

6 Claims, 8 Drawing Sheets

| Fig. 1A | Fig. 1B |

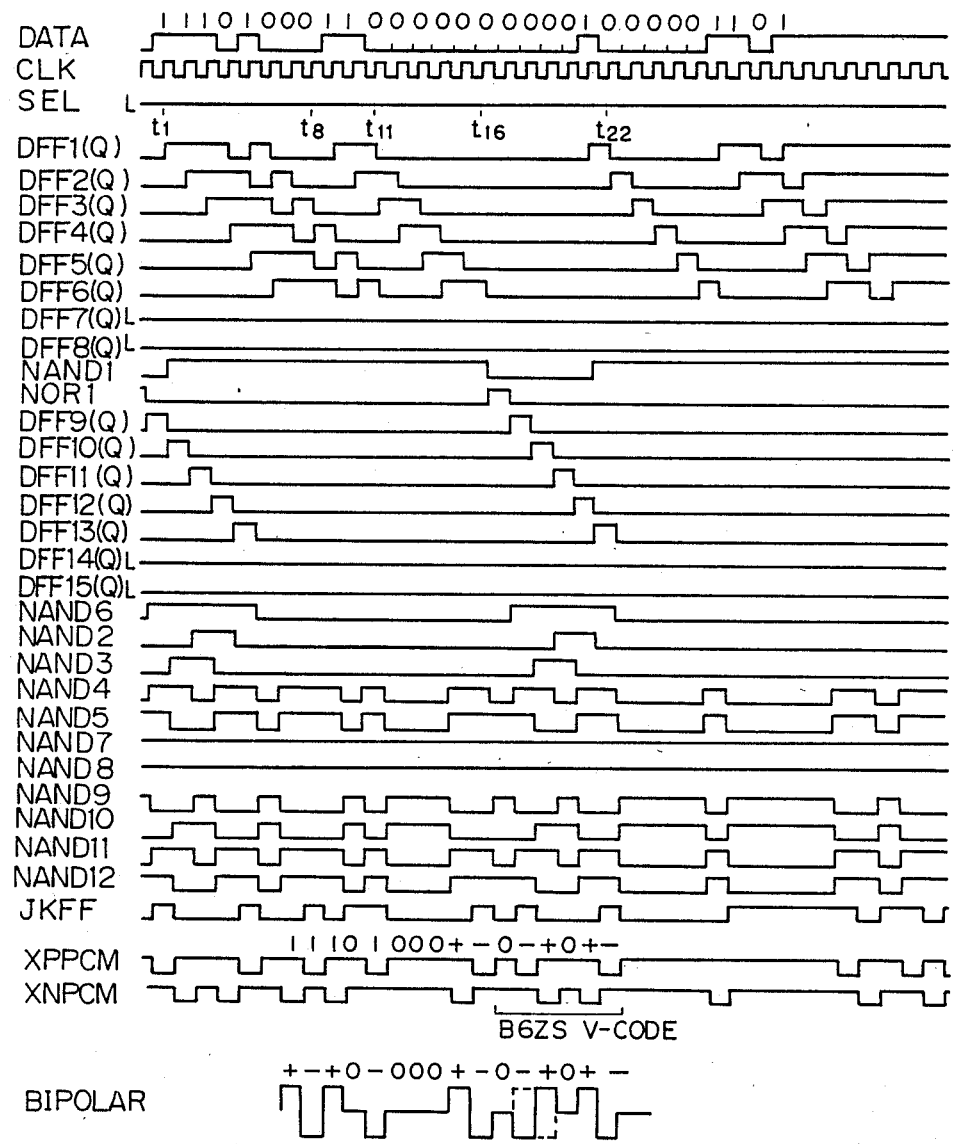

| Fig. 4 | |
|---|---|
| Fig. 4A | Fig. 4B |

BIPOLAR WITH EIGHT-ZEROS SUBSTITUTION AND BIPOLAR WITH SIX-ZEROS SUBSTITUTION CODING CIRCUIT

BACKGROUND OF THE INVENTION

1. Field of the Invention

The present invention (related to a bipolar with an eight-zeros substitution (B8ZS) and a bipolar with a six-zeros substitution (B6ZS) coding circuit used in a digital data communication system. More particularly, it relates to B8ZS·B6ZS coding circuit used in a digital data multiplexing system which provides a Z8ZS coded signal or B6ZS coded signal at a same timing, and can be formed by a simple circuit construction.

2. Description of the Related Art

In a digital communication system, for example, in a telephone communication system, data transferred in digital communication networks is multiplexed and converted into bipolar signals having three states: a positive logical "1", zero, and a negative logical "1". At a reception side, the received data is converted into unipolar signals having two states: a logical "1" and zero, and demultiplexed. The received bipolar signal is used for extracting a clock signal. Namely, the received bipolar signal is sent to a tank circuit and the clock signal is generated in response to a signal level change of the received bipolar signal. If the bipolar signal comprises consecutive zero data, the signal level is not changed while the consecutive zero data continues and a reasonable clock generation is not carried out, and accordingly, a circuit in a transmission side compulsorily generates a violation signal having a predetermined level change if the consecutive zero data is continued. In a first order group, using a 1.544 Mbps data transmission speed, of the digital communication network, the violation signal is generated when eight consecutive zeros are continued. In a second order group, using 6.312 Mbps of the digital communication network, the violation signal is generated when six consecutive zeros are continued. A B8ZS coding circuit and a B6ZS coding circuit are used to obtain the above violation signal generation. Frequently, a B8ZS·Z6ZS coding circuit, which is incorporated with the B8ZS coding circuit and the B6ZS coding circuit and is commonly used for the B8ZS coding or the B6ZS coding, is provided in repeater stations and/or terminal equipment in the digital telephone communication system.

However, in a prior B8ZS·B6ZS coding circuit, a time at which the generation of the violation signal for the eight consecutive zeros detection is started differs from that of the six zero detection. This time difference is a cause of a cumbersome data processing at the reception side. In addition, the prior B8ZS·B6ZS coding circuit suffers from a complex circuit construction.

SUMMARY OF THE INVENTION

An object of the present invention is to provide a B8ZS·B6ZS coding circuit generating a B8ZS coded signal or a B6ZS coded signal at a same starting time.

Another object of the present invention is to provide a B8ZS·B6ZS coding circuit which is formed by a simple circuit construction.

According to the present invention, there is provided a circuit for generating a bipolar coded signal corresponding to an input unipolar signal when the input unipolar signal does not include more than eight consecutive zeros data under a bipolar signal having an eight-zeros substitution (B8ZS) mode more than six consecutive zeros under a bipolar signal having a six-zeros substitution (B6ZS) mode, and generating a B8ZS violation coded signal when the input unipolar signal includes more than eight consecutive zeros data under the B8ZS mode or a B6ZS violation coded signal when the input unipolar signal includes more than six consecutive zeros data under the B6ZS mode. The B8ZS·B6ZS coding circuit includes a first shift register having eight series-connected flip-flops, receiving the input unipolar signal and shifting the same in response to a clock signal, the last two flip-flops in the series being reset under the B6ZS mode, a first gate receiving outputs from all flip-flops in the first shift register and outputting a first consecutive zero detection signal when all flip-flops in the first shift register are reset, a second shift register having seven series-connected flip-flops, the last two flip-flops in the series being reset under the B6ZS mode, a second gate receiving outputs from all flip-flops in the second shift register and outputting a second consecutive zero detection signal when all flip-flops in the second shift register are reset, a third gate receiving the first and the second consecutive zero detection signals from the first and the second gates and outputting a setting signal to the second shift register when both the first and second consecutive zero detection signals indicate consecutive zeros, the second shift register shifting the output from the third gate in response to the clock signal, an inverter receiving the output from the third gate and outputting an inverted signal, a fourth gate receiving outputs from a sixth flip-flop in the first shift register, first, second, fourth and fifth flip-flops in the second shift register, and outputting a first original coded signal, a fifth gate receiving outputs from the sixth flip-flop in the first shift register, the inverter, and the first, fourth and fifth flip-flops in the second shift register, and outputting a second original coded signal, and an output circuit receiving the first and second original coded signals from the fourth and fifth gates, and outputting a positive pulse coded modulation signal and a negative pulse coded modulation signal which are used as a bipolar signal.

The first shift register may include eight series-connected delay-type flip-flops. The first gate may include a NAND gate receiving inverted outputs of the delay-type flip-flops in the first shift register. The second shift register may include six series-connected delay-type flip-flops. The second gate may include a NAND gate receiving inverted outputs of the delay-type flip-flops in the second shift register. The third gate may include an NOR gate. The fourth gate may include an NAND gate receiving inverted outputs of the corresponding delay-type flip-flops in the first and second shift registers. The fifth gate may include a NAND gate receiving inverted outputs of the corresponding delay-type flip-flops in the first and second shift registers and the output of the inverter. The output circuit may include a JK-type flip-flop receiving the output from the fifth gate at J and K input terminals, a seventh NAND gate receiving the output from the fourth gate and a positive output from the JK-type flip-flop, and outputting the positive pulse coded modulation signal, and an eighth NAND gate receiving the output from the fourth gate and an inverted output from the JK-type flip-flop, and outputting the negative pulse coded modulation signal.

The first gate may include an AND gate receiving positive outputs of the delay-type flip-flops in the first shift register. The second gate may include an AND gate receiving positive inverted outputs of the delay-type flip-flops in the second shift register. The third gate may include an exclusive OR gate. The fourth gate may include an AND gate receiving positive outputs of the corresponding delay-type flip-flops in the first and second shift registers. The fifth gate may include an AND gate receiving positive outputs of the corresponding delay-type flip-flops in the first and second shift registers and the output of the inverter. The output circuit may include a JK-type flip-flop receiving the output from the fifth gate at J and K input terminals, a seventh AND gate receiving the output from the fourth gate and a positive output from the JK-type flip-flop, and outputting the positive pulse coded modulation signal, and an eighth AND gate receiving the output from the fourth gate and an inverted output from the JK-type flip-flop, and outputting the negative pulse coded modulation signal.

The B8ZS·B6ZS coding circuit may further include a circuit receiving the positive and negative pulse coded modulation signals from the output circuit and generating a bipolar signal having a positive logical one level, a zero level, and a negative one level.

BRIEF DESCRIPTION OF THE DRAWINGS

Other objects and features of the present invention will be described with reference to the accompanying drawings, in which

FIG. 3 is a timing chart illustrating a B6ZS coding by the B8ZS·B6ZS coding circuit shown in FIG. 1;

DESCRIPTION OF THE PREFERRED EMBODIMENTS

Figure 2:
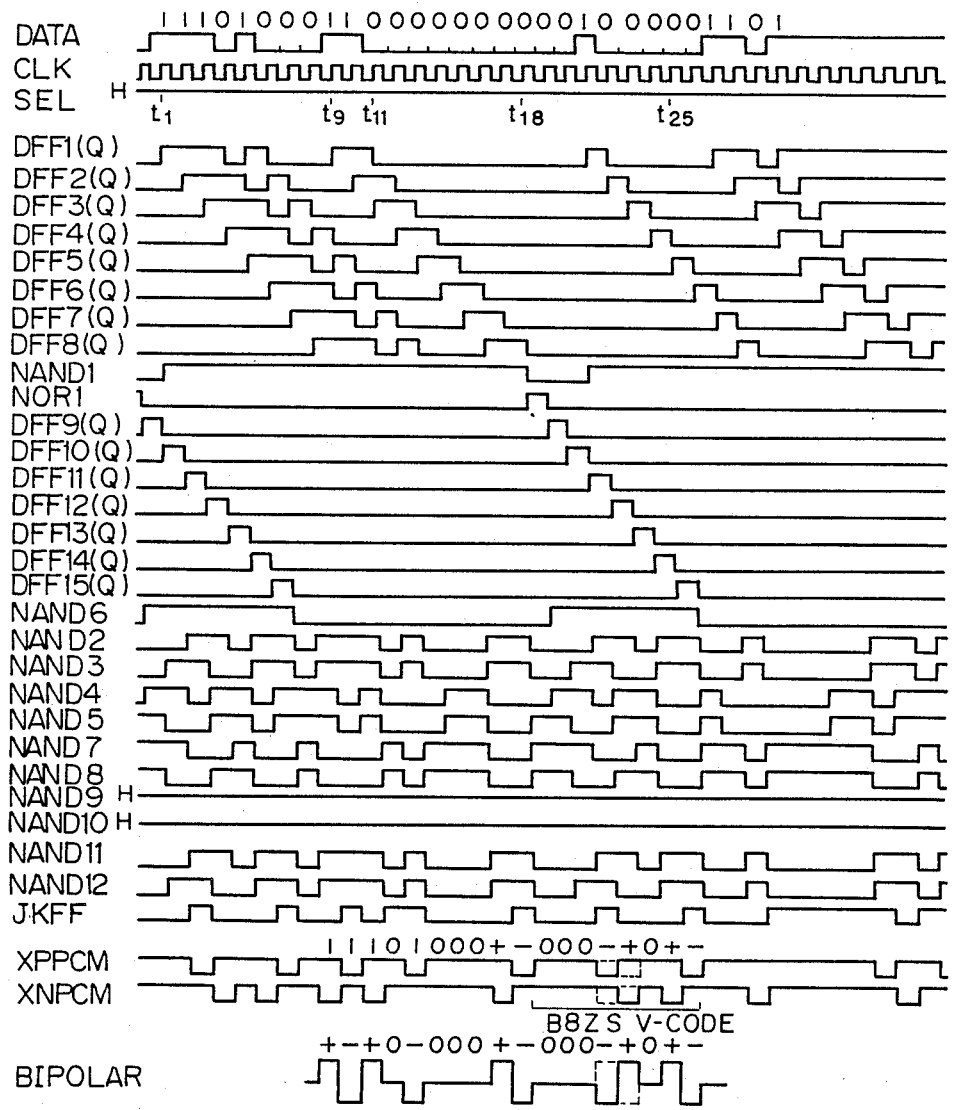
FIG. 2 is a timing chart illustrating a B8ZS coding by the B8ZS·B6ZS coding circuit shown in FIG. 1.

Before describing the preferred embodiment, the principle of B8ZS·B6ZS coding will be described in more detail. In a B8ZS coding, a B8ZS violation code: "000−+0+−", as shown as XPPCM and XNPCM in FIG. 2, is generated when eight consecutive zeros are input and a polarity of the last coded data just before the input of the eight consecutive zeros is negative, or when a polarity of the last coded data just before the input of the eight consecutive zeros is positive, another B8ZS violation code: "000+− 0−+" is generated. In a B6ZS coding, a B6ZS violation code: "0+− 0+1", as shown as XPPCM and XNPCM in FIG. 3, is generated when six consecutive zeros are input and a polarity of the last coded data just before the input of the six consecutive zeros is negative, or when a polarity of the last coded data just before the input of the six consecutive zeros is positive, another B6ZS violation code: "0+− 0−+" is provided.

In the above, a coded data "0" corresponds to an input data of a logical "0" and is represented by the XPPCM and XNPCM which are both high level. In a normal coding, consecutive logical ones data is coded into data alternating between a negative logical one and a positive logical one. A high level XPPCM and a low level XNPCM indicate a positive logical one, and a low level XPPCM and a high level XNPCM indicate a negative logical one. However, in a violation coding mode when the consecutive zero data is input, the B8ZS violation code signal "000−+0+−" as shown in FIG. 2, or the B6ZS violation code signal "0+− 0+−" as shown in FIG. 3, is generated. If normal two consecutive logical one data is input and coded in the normal manner, a coded signal as shown by dotted lines in FIG. 2 or FIG. 3 must be generated. However, this coded data is represented by solid lines which indicate illegal wave forms. Thus, the reception side becomes aware of the violation code of the B8ZS or B6ZS.

Figures 1, 1A:
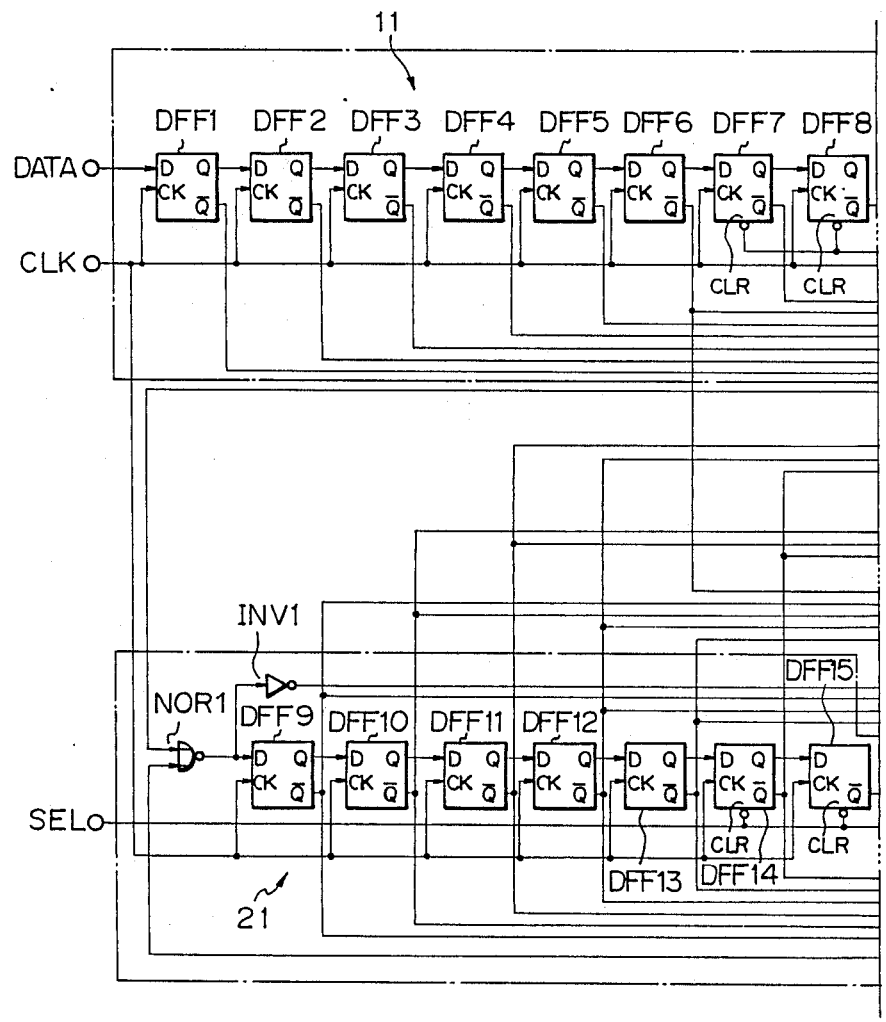
FIGS. 1a and 1b are circuit diagrams of a prior art B8ZS·B6ZS coding circuit.
Figure 1B:
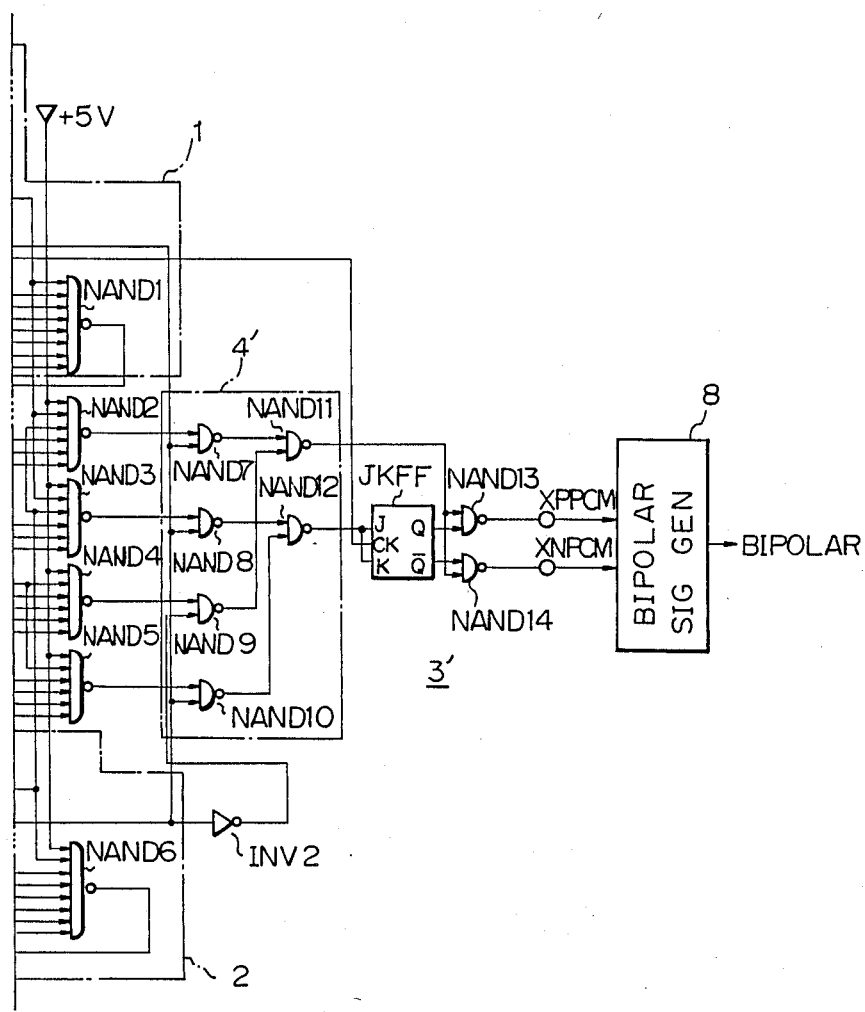

A prior art B8ZS·B6ZS coding circuit will be described with reference to FIGS. 1 to 3. In FIG. 1, the B8ZS·B6ZS coding circuit includes a shift register 11 consisting of eight series-connected delay-type-type flip-flops DFF1 to DFF8, and a NAND gate NAND1. These circuits 11 and NAND1 function as a consecutive zeros detection circuit 1. The B8ZS·B6ZS coding circuit also includes a NOR gate NOR1, a shift register 21 consisting of seven series-connected delay-type flip-flops DFF9 to DFF15, a NAND gate NAND6, and an inverter INV1. These circuits NOR1, 21, NAND6, INV1 function as an original violation code generation circuit 2. The B8ZS·B6ZS coding circuit includes a NAND gate NAND2 for generating an original positive B8ZS coded signal, and a NAND gate NAND3 for generating an original negative B8ZS coded signal. The B8ZS·B6ZS coding circuit includes a NAND gate NAND4 for generating an original positive B6ZS coded signal, and a NAND gate NAND5 for generating an original negative B6ZS coded signal. The B8ZS·B6ZS coding circuit also includes a selection circuit 4' consisting of NAND gates NAND7 to NAND12. When a selection signal SEL is high level, indicating a B8ZS coding, the original positive and negative B8ZS coded signals are output from the NAND gates NAND11 and NAND12. When the selection signal SEL is low level, indicating a B6ZS coding, the selection signal SEL is inverted at an inverter INV2, and the original positive and negative B6ZS coded signals are output from the NAND gates NAND11 and NAND12. When the selection signal SEL is low level, the selection signal SEL is supplied to inverted clear terminals CLR of the DFF7 and DFF8 in the shift register 11 and the DFF14 and DFF15 in the shift register 21, and these delay-type flip-flops DFF7, DFF8, DFF14 and DFF15 are compulsorily reset and high level signals output therefrom. The B8ZS·B6ZS coding circuit includes an output circuit 3' consisting of a JK-type flip-flop JKFF and NAND gates NAND13 and NAND14, and a positive pulse coded modulation signal XPPCM and a negative pulse coded modulation signal XNPCM are output from the NAND13 and NAND14. These pulse coded modulation signals XPPCM and XNPCM are used for generating a bipolar signal at a bipolar generation circuit 8. The NAND2 to NAND5 have six input terminals and the NAND6 has eight input terminals. Accordingly, a standard voltage of +5 VDC is supplied to spare input terminals of the NAND2 to NAND5 and the NAND6, respectively, to ensure operational stability, but this supply of the standard voltage of +5 VDC is not essential to the present invention.

The operation of the B8ZS coding will be described by referring to FIG. 2.

The selection signal SEL having a high level "H" is supplied, and when the data DATA is supplied to the shift register 11 at a time $t_1$, the DATA is shifted through the DFF1 to DFF8 in response to the clock CLK and the respective shifted data is output from positive output terminals Q of the DFF1 to DFF8 as shown in FIG. 2. Conversely, inverted shifted data from negative output terminals $\overline{Q}$ of the DFF1 to DFF8 is supplied to the NAND1. An output of the NAND1 becomes low level when all eight input signals are high level, i.e., when eight consecutive zeros data is supplied to the shift register 11. At an initial condition, outputs from the NAND1 and NAND6 are low level, and as a result, an output of the NOR1 becomes high level. The high level output is supplied to the DFF9. When the data "1" is supplied at the time $t_1$, the output of the NAND1 becomes high level, and the output of the NOR1 becomes low level.

A single pulse is shifted in the shift register 21, i.e., through the DFF9 to DFF15, in response to the CLK. When all inverted outputs $\overline{Q}$ of the DFF9 to DFF15 become high level, the output of the NAND6 becomes low. But, the output of the NAND1 remains at the high level.

At a time $t_9$, the inputs to input terminals of the NAND2 are as follows:
inverted output of the DFF8: low level
inverted output of the DFF15: high level
inverted output of the DFF11: high level
inverted output of the DFF12: high level
inverted output of the DFF14: high level
standard voltage: always high level.

Accordingly, an output of the NAND2 is high level, and this high level signal is output from the NAND1 as the positive B8ZS selection signal having a high level. Similarly, the inputs to input terminals of the NAND3 are as follows:
inverted output of the DFF8: low level
inverted output of the DFF15: high level
inverted output of the DFF10: high level
inverted output of the DFF11: high level
inverted output of the DFF14: high level
standard voltage: always high level.

Accordingly, an output of the NAND3 is also high level, and this high level signal is output from the NAND12 as the negative B8ZS selection signal having a high level. At this time, a positive output Q of the JKFF is low level and an inverted output $\overline{Q}$ of the JKFF is high level, and accordingly, the positive pulse coded modulation signal XPPCM having a high level and the negative pulse coded modulation signal XNPCM having a low level are output.

In FIG. 2, a combination of the high level positive pulse coded modulation signal XPPCM and the low level negative pulse coded modulation signal XNPCM indicates a logical "1" having a positive polarity and is represented by "+". A combination of the low level positive pulse coded modulation signal XPPCM and the high level negative coded pulse signal XNPCM indicates a logical "1" having a negative polarity and is represented by "−". A combination of the high level positive pulse coded modulation signal XPPCM and the high level negative pulse coded modulation signal XNPCM indicates a logical "1" and is represented by "0".

At the next time $t_9$, the JKFF is changed in response to a next CLK since J- and K-inputs are supplied by the above high level signal from the NAND12. The output of the NAND2 is still high level, and as a result, the positive pulse coded modulation signal XPPCM becomes low level and the negative pulse coded modulation signal XNPCM becomes high level. This indicates a logical "1" having the negative polarity.

At a further next time $t_9$, the JKFF is further changed in response to an application of a further next CLK, since the output of the NAND12 is still high level, and the output of the NAND2 is also still high level. As a result, the positive pulse coded modulation signal XPPCM becomes high level, and the negative pulse coded modulation signal XNPCM becomes low level. This indicates a logical "1" having the positive polarity.

The above continuous logical "1" having the positive polarity, logical "1" having the negative polarity and logical "1" having the positive polarity correspond to the first three logical ones input data DATA, and the B8ZS·B6ZS coding circuit, in the B8ZS coding mode, outputs corresponding positive and negative pulse coded modulation signals XPPCM and XNPCM after an eight clock delay.

When eight consecutive zeros data DATA is applied to the shift register 11 during times $t_{11}$ and $t_{18}$, the NAND1 outputs a low level signal to the NOR1, and since the output of the NAND6 is low level, the output of the NOR1 becomes high level. The high level output of the NOR1 is applied to the DFF9 in the shift register 21 to set the DFF9 at a next clock CLK, and the output of the NAND6 again becomes high level. Accordingly, a single pulse is supplied to the shift register 21 from the NOR1 and shifted in the shift register 21. During times $t_{18}$ and $t_{25}$, the B8ZS·B6ZS coding circuit outputs the B8ZS violation code signal: "000−+0+−" shown in FIG. 2, but the true violation code signal is "0−+0+−". The first two zeros of the B8ZS violation code signal correspond to the first two zeros of the eight consecutive zeros of the DATA.

The operation of the B6ZS coding will now be described with reference to FIG. 3.

The selection signal SEL having a low level "L" is supplied, and the DFF7 and DFF8 in the shift register 11 and the DFF14 and DFF15 in the shift register 21 are compulsorily reset and output high level signals from the inverted output terminals $\overline{Q}$ thereof, and the NAND9 and NAND10 in the selection circuit 4' are selected. Thus, the outputs of the NAND4 and NAND5 are the object of interest when discussing the B6ZS coding.

In FIG. 3, the data trains DATA are same as those in FIG. 2, and the basic operation is the same as that of FIG. 2. However, since the DFF7 and DFF8, and the DFF4 and DFF15 are compulsorily reset, a first B6BZ coded signal consisting of the positive pulse coded modulation signal XPPCM having a high level and the negative pulse coded signal XNPCM having a low level, corresponding to a first logical "1" of the data trains DATA, is output at a time $t_8$.

The consecutive zero data DATA is started from a time $t_{11}$, and at a time $t_{16}$, a first B6ZS violation signal having a zero level corresponding to a first zero data of the consecutive zero data is output. At a next clock time, a second B6ZS violation data consisting of the positive pulse coded modulation signal XPPCM having a low level and the negative pulse coded modulation signal XNPCM having a high level, thus indicating a logical "1" having a negative polarity, is output. Subsequently, a logical "1" having a positive polarity, a zero level, a logical "1" having a positive polarity and a logical "1" having a negative polarity, which form the B6ZS violation code together with the above first violation code of zero and a second logical "1" having the negative polarity, are generated.

Compared with the first B8ZS violation code signal generation time $t_{18}$ and the first B6ZS violation code signal generation time $t_{16}$, the first B6ZS violation code signal generation time $t_{16}$ is two clocks prior to the first B8BZ violation code signal generation time. This time lag cause a cumbersome data processing at the reception side.

In addition, the B8ZS·B6ZS coding circuit shown in FIG. 1 is relatively complex. As many B8ZS·B6ZS coding circuits, for example, approximately 280 B8ZS·B6ZS coding circuits for ten basic cells each cell including 28 B8ZS·B6ZS coding circuits when using a first and third order group multiplexing (13 MUX) system, are used, a compact B8ZS B6ZS coding circuit is required.

Now, an embodiment of a B8ZS·B6ZS coding circuit in accordance with the present invention will be described with reference to FIGS. 4 to 6.

Figure 4A:
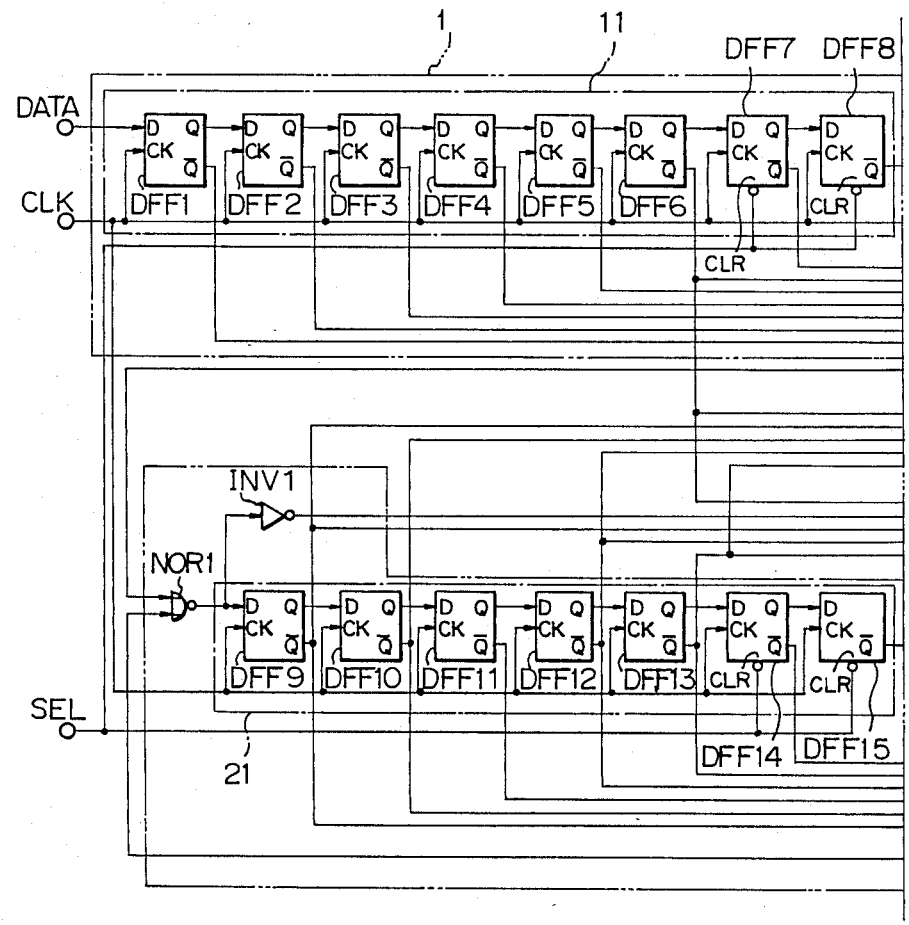
FIGS. 4a and 4b are circuit diagrams of an embodiment of a B8ZS·B6ZS coding circuit in accordance with the present invention.
Figure 4B:
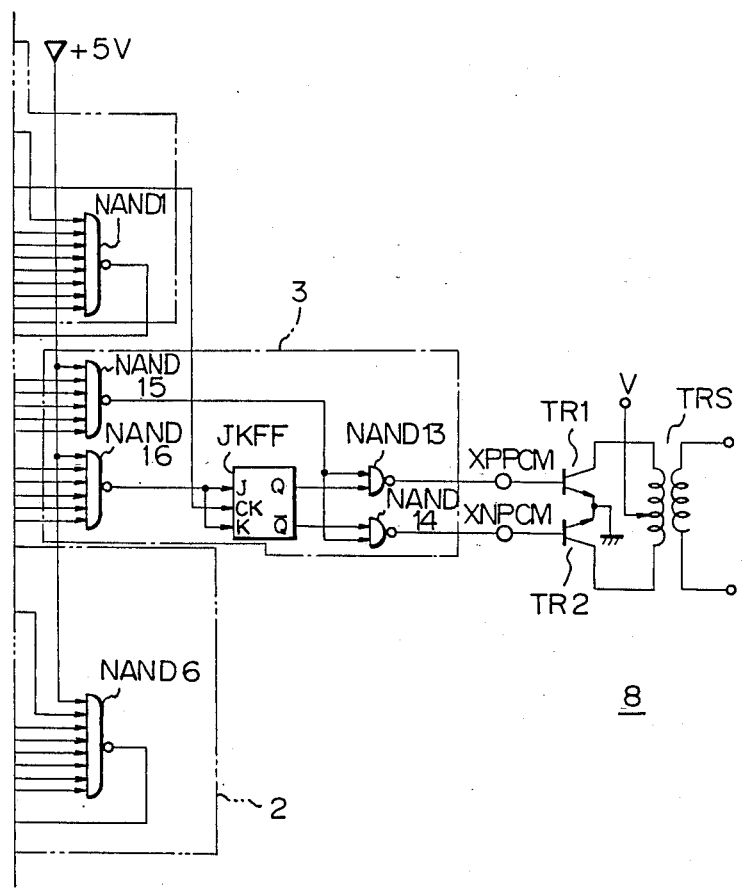

In FIG. 4, the B8ZS·B6ZS coding circuit includes the consecutive zeros data detection circuit 1 having the shift register 11 consisting of eight series-connected delay-type flip-flops DFF1 to DFF8, and the NAND gate NAND1. The B8ZS·B6ZS coding circuit also includes the original violation code generation circuit 2 having the shift register 21 consisting of seven series-connected delay-type flip-flops DFF9 to DFF15, the inverter INV1, the NOR gate NOR1, and the NAND gate NAND6. The consecutive zeros data detection circuit 1 and the original violation code generation circuit 2, per se, are the same as those shown in FIG. 1.

As shown in FIG. 4, a selection and output circuit 3 is provided which includes NAND gates NAND15 and NAND16. The selection and output circuit 3 also includes the JK-type flip-flops JKFF and the NAND gates NAND13 and NAND14. The latter corresponds to the output circuit 3' shown in FIG. 1.

In FIG. 4, the bipolar signal generation circuit 8 shown in FIG. 1 is concretely shown. The bipolar signal generation circuit 8 includes transistors TR1 and TR2 and a transformer TRS, and a commonly connected point of the emitters of the transistors TR1 and TR2 is grounded. A center portion of a primary coil of the transformer TRS is supplied with a predetermined DC voltage V, and a bipolar signal BIPOLAR shown in FIGS. 5 and 6 is output between output terminals of a secondary coil of the transformer TRS. The operation of the bipolar signal generation circuit 8 will be described later. Table 1 shows the inputs of the NAND15 and NAND16 shown in FIG. 4.

TABLE 1

|  | NAND15 | NAND16 |
|---|---|---|
| $\overline{DFF6}$ | o | o |
| $\overline{DFF9}$ | o | o |
| $\overline{DFF10}$ | o | — |
| $\overline{DFF12}$ | o | o |
| $\overline{DFF13}$ | o | o |

TABLE 1-continued

|  | NAND15 | NAND16 |
|---|---|---|
| $\overline{INV1}$ | — | o |

In the Table 1, $\overline{DFF6}$ to $\overline{DFF13}$ and $\overline{INV1}$ represent the inverted outputs of the DFF6 to DFF13 and the inverted output of the inverter INV1.

Table 2 shows the inputs of the NAND2 to NAND5 shown in FIG. 1.

TABLE 2

|  | NAND2 | NAND3 | NAND4 | NAND5 |
|---|---|---|---|---|
| $\overline{DFF6}$ | — | — | o | o |
| $\overline{DFF8}$ | o | o | — | — |
| $\overline{DFF9}$ | — | — | o | o |
| $\overline{DFF10}$ | — | o | o | — |
| $\overline{DFF11}$ | o | o | — | — |
| $\overline{DFF12}$ | o | — | o | o |
| $\overline{DFF13}$ | — | — | o | o |
| $\overline{DFF14}$ | o | o | — | — |
| $\overline{DFF15}$ | o | o | — | — |
| $\overline{INV1}$ | — | — | — | o |

Compared with Tables 1 and 2, the inputs of the NAND15 correspond to the inputs of the NAND4, and the inputs of the NAND15 correspond to the inputs of the NAND5.

In FIG. 1, the connection among the inverted outputs from the shift register 21, the inverted output of the INV1, and the NAND4 and NAND5 is sufficient to generate the normal B8ZS code and/or B6ZS code signal, and the B6ZS violation code. As described above with reference to FIGS. 2 and 3, the essential portion of the B8ZS violation code and the B6ZS violation code consists of "0 − + 0 + −" when the last coded logical "1" just before the "1" of the first violation code is a logical "1" having the negative polarity. When the last code logical "1" just before the "0" of the first violation code is a logical "1" having the positive polarity, the essential portion of the B8ZS violation code and the B6ZS violation code consists of "0 + − 0 − +".

As discussed above, the B8ZS·B6ZS coding circuit shown in FIG. 4 is constructed to generate the normal B8ZS code signal and B6ZS code signal, and, the B6ZS violation code signal as well as the B8ZS violation code in the B6ZS violation code generation manner. As a result, a start time $t_{16}$ of the B8ZS violation code signal shown in FIG. 5 is the same as a start time $t_{16}$ of the B6ZS violation code signal shown in FIG. 6. However, since the DFF7, the DFF8, the DFF14, and the DFF15 operate in a normal manner when the selection signal SEL is high level, indicating the B8ZS coding, a total violation code of the B8ZS, per se, is maintained as shown in FIG. 5.

In addition, the NAND2 and the NAND3 are omitted, and thus the NAND7 to the NAND12 are also omitted.

The operation of the JKFF, the NAND13, and the NAND14 shown in FIG. 4 is the same as that of those shown in FIG. 1.

Figure 5:
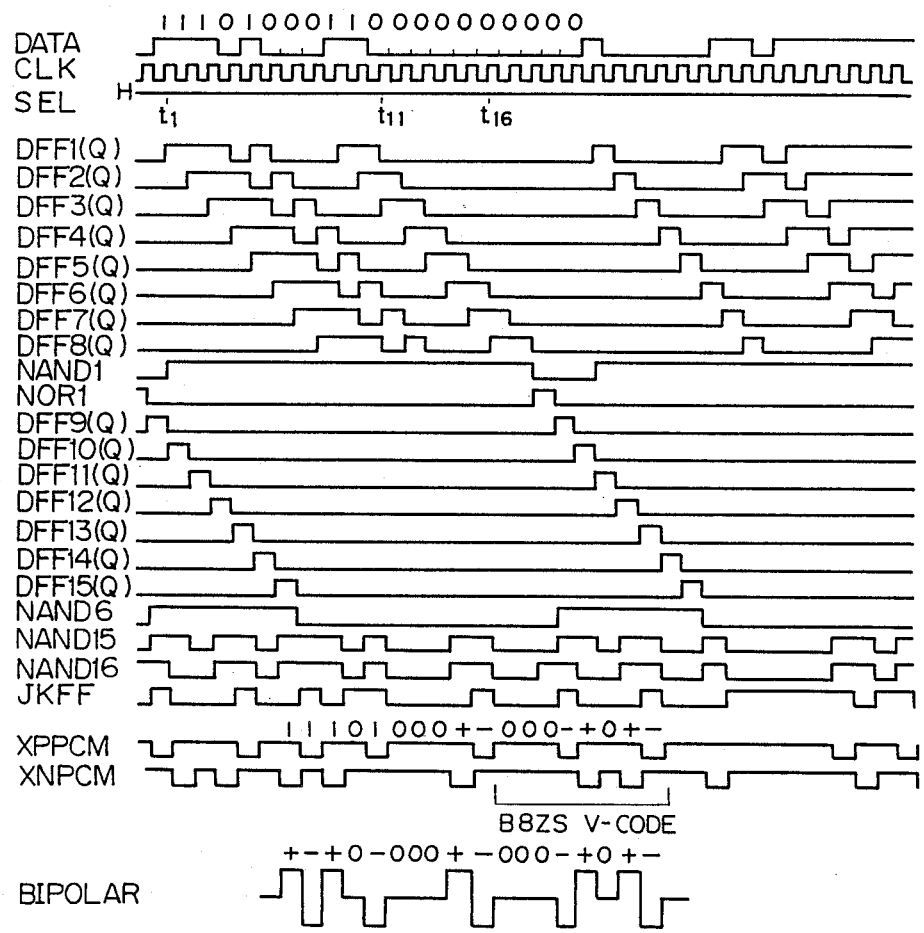
FIG. 5 is a timing chart representing a B8ZS coding by the B8ZS·B6ZS coding circuit shown in FIG. 4.
Figure 6:
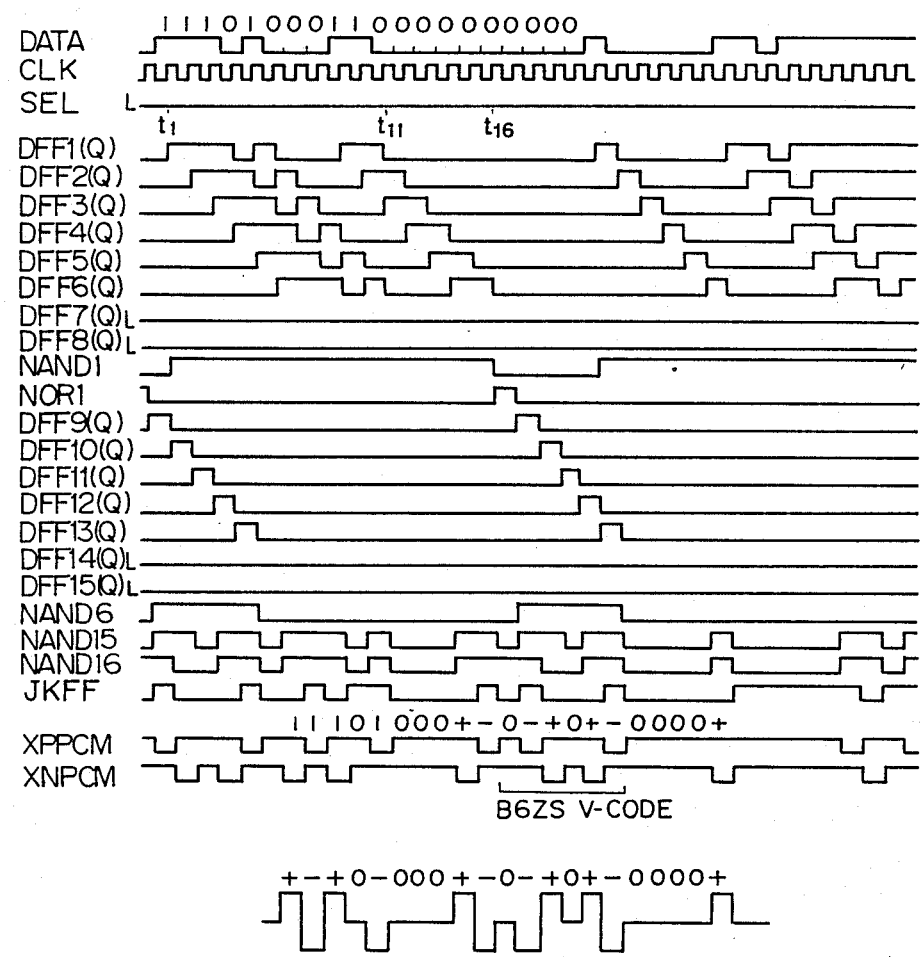
FIG. 6 is a timing chart representing a B6ZS coding by the B8ZS·B6ZS coding circuit shown in FIG. 4.

The operation shown in FIG. 5 is similar to that shown in FIG. 2, except for the above differences. FIG. 5 is the same as FIG. 3, because the B6ZS coding is the same in both of the B8ZS·B6ZS coding circuits shown in FIGS. 1 and 4.

The operation of the bipolar signal generation circuit 8 will be described.

When both of the positive and negative pulse coded modulation signals XPPCM and XNPCM are zero level, both of the transistors TR1 and TR2 are turned OFF, and the output of the secondary coil of the transformer TRS is zero level. When the positive pulse coded modulation signal XPPCM is high level and the negative pulse coded modulation signal XNPCM is low level, the transistor TR1 is turned ON and the transistor TR2 is turned OFF. A current flows through an upper side coil of the primary coil, the transistor TR1, and the ground, and as a result, a positive polarity signal is induced in the secondary coil of the transformer TRS. On the other hand, when the positive pulse coded modulation signal XPPCM is low level and the negative pulse coded modulation signal XNPCM is high level, a negative polarity signal is induced. The bipolar signal BIPOLAR is shown in FIGS. 5 and 6.

The bipolar signal BIPOLAR is transferred in the digital communication network.

Another embodiment of a B8ZS·B6ZS coding circuit will be described. The NAND1, the NAND15, the NAND16 and the NAND6 shown in FIG. 4, can be replaced by AND gates, and an OR gate can be used instead of the NOR1. The NAND13 and the NAND14 can be also replaced by AND gates. In this case, the inputs of the AND gates corresponding to the NAND1, the NAND15, the NAND16 and the NAND6 are the outputs of the positive output terminals of the shift registers 11 and 21.

The DFF1 to the DFF8 in the shift register 11 can be replaced by other flip-flops. Also, the DFF9 to the DFF15 can be replaced by other flip-flops.

Many widely different embodiments of the present invention may be constructed without departing from the spirit and scope of the present invention. It should be understood that the present invention is not restricted to the specific embodiments described above, except as defined in the appended claims.

We claim:

1. A circuit for generating a bipolar coded signal corresponding to an input unipolar signal when the input unipolar signal does not include more, than eight consecutive zeros data under a bipolar signal having an eight-zeros substitution (B8ZS) mode or more than six consecutive zeros under a bipolar signal having a six-zeros substitution (B6ZS) mode, and generating a B8ZS violation coded signal when the input unipolar signal includes more than eight consecutive zeros data under the B8ZS mode or a B6ZS violation coded signal when the input unipolar signal includes more than six consecutive zeros data under the B6ZS mode, comprising:

a first shift register having eight series-connected flip-flops, receiving the input unipolar signal and shifting the same in response to a clock signal, the last two flip-flops in said series being reset under the B6ZS mode;

a first gate receiving outputs from all flip-flops in the first shift register and outputting a first consecutive zero detection signal when all flip-flops in the first shift register are reset;

a second shift register having seven series-connected flip-flops, the last two flip-flops in said series being reset under the B6ZS mode;

a second gate receiving outputs from all flip-flops in the second shift shift register and outputting a second consecutive zero detection signal when all flip-flops in the second shift register are reset;

a third gate receiving the first and the second consecutive zero detection signals from the first and the second gates and outputting a setting signal to the second shift register when both the first and second consecutive zero detection signals indicate consecutive zeros, the second shift register shifting the output from the third gate in response to the clock signal;

an inverter receiving the output from the third gate and outputting an inverted signal, a fourth gate receiving outputs from a sixth flip-flop in the first shift register, and a first, second, fourth and fifth flip-flop in the second shift register, and outputting a first original coded signal;

a fifth gate receiving outputs from the sixth flip-flop in the first shift register, the inverter, and the first, fourth and fifth flip-flops in the second shift register, and outputting a second original coded signal; and an output circuit receiving the first and second original coded signals from the fourth and fifth gates, and outputting a positive pulse coded modulation signal and a negative pulse coded modulation signal which are used as a bipolar signal.

2. A circuit according to claim 1, wherein the first shift register comprises eight series-connected delay-type flip-flops, and the first gate comprises a NAND gate receiving inverted outputs of the delay-type flip-flops in the first shift register, wherein the second shift register comprises six series-connected delay-type flip-flops, and the second gate comprises a NAND gate receiving inverted outputs of the delay-type flip-flops in the second shift register, wherein the third gate comprises a NOR gate, and wherein the fourth gate comprises a NAND gate receiving inverted outputs of the corresponding delay-type flip-flops in the first and second shift registers, and the fifth gate comprises a NAND gate receiving inverted outputs of the corresponding delay-type flip-flops in the first and second shift registers and the output of the inverter.

3. A circuit according to claim 2, wherein the output circuit comprises a JK-type flip-flop receiving the output from the fifth gate at J and K input terminals, a seventh NAND gate receiving the output from the fourth gate and a positive output from the JK-type flip-flop, and outputting the positive pulse coded modulation signal, and an eighth NAND gate receiving the output from the fourth gate and an inverted output from the JK-type flip-flop, and outputting the negative pulse coded modulation signal.

4. A circuit according to claim 1, wherein the first shift register comprises eight series-connected delay-type flip-flops, and the first gate comprises an AND gate receiving positive outputs of the delay-type flip-flops in the first shift register, wherein the second shift register comprises six series-connected dela-type flip-flops, and the second gate comprises an AND gate positive inverted outputs of the delay-type flip-flops in the second shift register, wherein the third gate comprises an exclusive OR gate, and wherein the fourth gate comprises an AND gate receiving positive outputs of the corresponding delay-type flip-flops in the first and second shift registers, and the fifth gate comprises an AND gate receiving positive outputs of the corresponding delay-type flip-flops in the first and second shift registers and the output of the inverter.

5. A circuit according to claim 2, wherein the output circuit comprises a JK-type flip-flop receiving the output from the fifth gate at J and K input terminals, a seventh AND gate receiving the output from the fourth gate and a positive output from the JK-type flip-flop, and outputting the positive pulse coded modulation signal, and an eighth AND gate receiving the output from the fourth gate and an inverted output from the JK-type flip-flop, and outputting the negative pulse coded modulation signal.

6. A circuit according to claim 1, further comprising a circuit receiving the positive and negative pulse coded modulation signals from the output circuit and generating a bipolar signal having a positive logical one level, a zero level and a negative logical one level.

* * * * *

UNITED STATES PATENT AND TRADEMARK OFFICE
CERTIFICATE OF CORRECTION

PATENT NO. : 4,887,083
DATED : DECEMBER 12, 1989
INVENTOR(S) : TORU KOSUGI ET AL.

It is certified that error appears in the above-identified patent and that said Letters Patent is hereby corrected as shown below:

Col. 1, line 8, "(related" should be --relates--;
line 13, "Z8ZS" should be --B8ZS--;
line 43, "B8ZS.Z6ZS" should be --B8ZS.B6ZS--.

Col. 4, line 18, "delay-type-type" should be --delay-type--.

Col. 5, line 48, "Q" should be --$\overline{Q}$--.

Col. 6, line 52, "B6BZ" should be --B6ZS--.

Col. 7, line 9, "B8BZ" should be --B8ZS--.

Col. 8, line 50, ""1"" (second occurrence) should be --"0"--.

Col. 9, line 56, "more," should be --more--.

Col. 10, line 11, delete "shift" (second occurrence).

Col. 11, line 4, "dela-type" should be --delay-type--.

Signed and Sealed this

Eighteenth Day of December, 1990

*Attest:*

HARRY F. MANBECK, JR.

*Attesting Officer*     *Commissioner of Patents and Trademarks*